Nov. 11, 1924.  E. P. ELZEY  1,514,896
ANTISKID CHAIN
Filed April 9, 1923
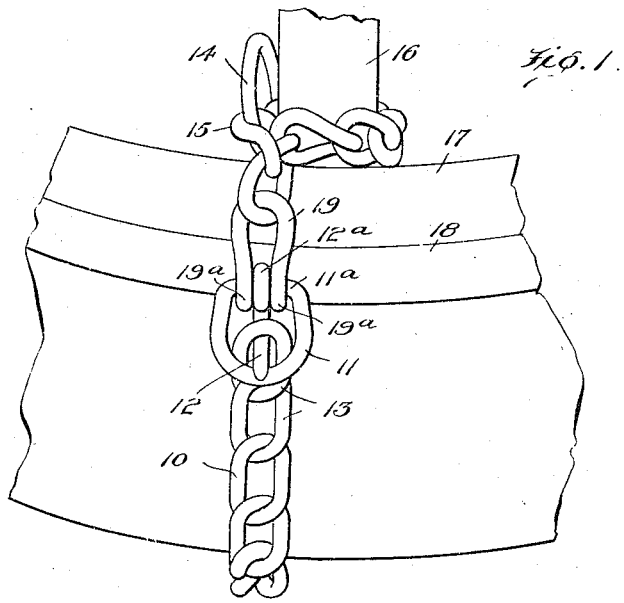
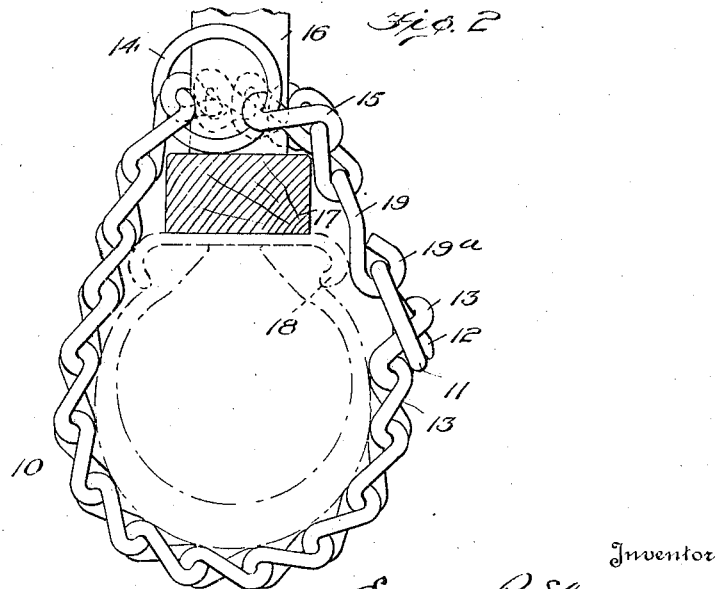
Inventor
Edgar P. Elzey
By Church & Church
his Attorneys Patented Nov. 11, 1924.

1,514,896

UNITED STATES PATENT OFFICE.

EDGAR P. ELZEY, OF PARKERSBURG, WEST VIRGINIA, ASSIGNOR TO ROBERT J. McKAY, THOMAS J. McKAY, AND FRANK A. BOND, ALL OF PITTSBURGH, PENNSYLVANIA.

ANTISKID CHAIN.

Application filed April 9, 1923. Serial No. 630,953.

*To all whom it may concern:*

Be it known that I, EDGAR P. ELZEY, a citizen of the United States, residing at Parkersburg, in the county of Wood and State of West Virginia, have invented certain new and useful Improvements in Antiskid Chains; and I do hereby declare the following to be a full, clear, and exact description of the same, reference being had to the accompanying drawings, forming part of this specification.

This invention relates to anti-skid devices and particularly to an anti-skid chain that is especially adapted for use in emergencies such as when a vehicle is mired, under which circumstances it is important that the chain used for giving the vehicle wheels tractive power be easily attached to one or more of the wheels. For this reason the chain disclosed in the present case may properly be termed a mud chain but it will be understood that this invention is applicable to other types of chain and is not to be limited to any one form of chain.

An object of the present invention is to provide an anti-skid chain with fastening means that will render the device easily and quickly attachable to and detachable from a vehicle wheel. To further increase the ease and speed with which the device may be applied to the wheel, the invention also comprehends the provision of means that are conveniently manipulated for positioning the chain on the wheel, these latter means being so arranged as to lend aid in positioning and securing the fastening means by which the chain is attached to the wheel.

As the present invention also contemplates the use of fastening means in the form of a buckle, as disclosed in my prior Patent No. 1,445,305, dated February 13, 1923, a further object is to arrange the parts of the buckle and the connecting link by which it is coupled to the chain proper whereby the tongue of the buckle will be prevented from moving to the sides of the buckle loop and said loop will be prevented from twisting when the chain is being placed on or taken off of the wheel or while it is actually in use on the wheel. This is an important feature for it not only insures against strains being improperly placed on the buckle and tongue but it also insures ease and speed in placing the device on the wheel or removing it therefrom.

In the accompanying drawing—

Fig. 1 is a side view of a portion of a wheel with a mud chain embodying the present invention applied thereto.

Fig. 2 is a transverse sectional view of the structure shown in Fig. 1.

In its preferred form the present device, like that of my prior patent before referred to, comprises an elongated section of chain 10 of sufficient length to loosely encircle the rim, felloe and wheel tire. This chain 10 is secured around said wheel parts by a buckle 11 at one end whose tongue 12 is capable of engaging any one of a number of open-center links 13 at the opposite end of the chain.

To position the device on the wheel and prevent it moving circumferentially thereof, there is provided an enlarged ring 14 which is preferably connected to the chain 10 by an elongated link 15, the length of the link and ring combined being sufficient to extend about half way around one of the wheel spokes 16. When applying the device to a wheel said link and ring are laid across the inner face of the felloe 17 at one side of one of the spokes and the open-center link end of the chain is passed around the opposite side of the spoke. The chain is then run through the enlarged ring and then passed around the tire and through the buckle loop 11 where its end is secured by the buckle tongue 12 engaging through the proper link.

The buckle 11 is secured to the end of the chain 10 and the connecting ring 14 and link 15 are attached to an intermediate portion of the chain but in proximity to said buckle, the distance between said link and the buckle being such that the buckle will always be located or positioned to hang at the side of the rim 18 while the opposite end of the chain is being run through ring 14. With this arrangement, the buckle is more or less automatically positioned always at the same place, i. e., at the side of the wheel rim and tire, when the chain is being applied to the wheel. By connecting the ring and link to the chain intermediate the ends of the latter, the two ends of the chain remain free and can, therefore, be easily handled.

Further improvements contemplated by the present invention consist in the provision of means for maintaining the buckle tongue substantially central longitudinally of the buckle loop and the loop in substantial alinement with the chain links connected thereto. The buckle loop 11 has an end bar 11ᵃ for the eye 12ᵃ of the buckle tongue 12 and said end bar 11ᵃ is held in eyes 19ᵃ formed at the free ends of a U-shaped coupling link 19 which constitutes the end link of chain 10. In embodying this last mentioned feature in the present device the eye 12ᵃ of the buckle tongue is fitted snugly between the free ends of coupling link 19, the ends of said link converging and the eyes 19ᵃ at their extremities lying close to but not quite touching the sides of the buckle loop. There is, of course, a certain amount of looseness between these several parts so that they will not be apt to become stuck but by forming the coupling link 19 with converging free ends that lie close to the sides of the buckle loop and fitting the buckle tongue snugly between said converging ends, the buckle loop may be made with a comparatively short end bar, thus increasing its strength. In addition, the buckle tongue will be maintained substantially central longitudinally of the buckle loop and in alinement with the adjacent chain links both during the act of connecting and disconnecting the chain ends and when under strain and, when under the latter condition, the parts tend to lie flat against the rim and resist any tendency to roll or to be rolled over.

What is claimed is:—

An anti-skid device for vehicle wheels comprising an elongated section of chain having a loop at one end, a free end swingable locking finger spanning the loop, a series of open-center links at the opposite end of the chain adapted to extend through said loop with any one of the links receiving said locking finger, means for maintaining the finger substantially central longitudinally of the loop and the loop in substantial alinement with the adjacent links of the chain connected thereto, and a link and ring connected to an intermediate portion of the elongated chain section, said ring being enlarged to permit the open-center link end of the chain to be passed therethrough whereby said link, ring and an intermediate portion of the chain completely encircle one of the wheel spokes to position the device on the wheel and said fastening means and the adjacent end of said chain are positioned at the side of the wheel while the device is being placed on the wheel.

EDGAR P. ELZEY.